(12) United States Patent
Oh et al.

(10) Patent No.: US 9,690,030 B2
(45) Date of Patent: Jun. 27, 2017

(54) LIGHT EMITTING DEVICE INCLUDING A LENS AT A PREDETERMINED POSITION AND BACKLIGHT UNIT COMPRISING SAME

(71) Applicant: LUMENS CO., LTD., Yongin-si, Gyeonggi-do (KR)

(72) Inventors: Seung Hyun Oh, Gwangju-si (KR); Pyoung Gug Kim, Hwaseong-si (KR); Seung Hoon Lee, Yongin-si (KR)

(73) Assignee: LUMENS CO., LTD., Yongin-si (KR)

( * ) Notice: Subject to any disclaimer, the term of this patent is extended or adjusted under 35 U.S.C. 154(b) by 0 days.

(21) Appl. No.: 14/650,119

(22) PCT Filed: Nov. 29, 2013

(86) PCT No.: PCT/KR2013/010966
§ 371 (c)(1),
(2) Date: Jun. 5, 2015

(87) PCT Pub. No.: WO2014/088260
PCT Pub. Date: Jun. 12, 2014

(65) Prior Publication Data
US 2015/0316700 A1    Nov. 5, 2015

(30) Foreign Application Priority Data
Dec. 7, 2012 (KR) ........................ 10-2012-0142208

(51) Int. Cl.
*F21V 8/00* (2006.01)
*G02B 19/00* (2006.01)
*G02B 7/02* (2006.01)

(52) U.S. Cl.
CPC ........... *G02B 6/003* (2013.01); *G02B 6/0031* (2013.01); *G02B 6/0073* (2013.01); *G02B 7/025* (2013.01);
(Continued)

(58) Field of Classification Search
None
See application file for complete search history.

(56) References Cited

U.S. PATENT DOCUMENTS

| 6,274,890 B1* | 8/2001 | Oshio | H01L 33/486 |
|---|---|---|---|
| | | | 257/100 |
| 2003/0067264 A1* | 4/2003 | Takekuma | H01L 33/507 |
| | | | 313/501 |

(Continued)

FOREIGN PATENT DOCUMENTS

| JP | 60-184241 | 6/1987 |
|---|---|---|
| JP | 2001-351264 A | 12/2001 |

(Continued)

OTHER PUBLICATIONS

Japanese Office Action mailed Apr. 26, 2016 from Japanese Patent Application No. 2015-546375, 5 pgs.
(Continued)

*Primary Examiner* — Britt D Hanley
(74) *Attorney, Agent, or Firm* — Ichthus International Law, PLLC

(57) ABSTRACT

A light emitting device capable of bonding a lens at a preset accurate position, and a backlight unit comprising the same are provided. The light emitting device includes a molded material having an opening through which light generated from a light emitting element disposed in the molded material is emitted, a projecting support disposed along at least part of a circumference of the opening of the molded material, and a lens having an inner surface that defines an internal surface on which light emitted from the light emitting element is incident, an outer surface that defines an external surface from which the incident light is emitted to the outside, and a bottom surface that connects the inner surface and the outer surface, wherein a boundary between
(Continued)

the inner surface and the bottom surface, a lower part of the inner surface, or the bottom surface contacts the projecting support.

13 Claims, 7 Drawing Sheets

(52) U.S. Cl.
CPC .......... *G02B 19/0061* (2013.01); *G02B 6/009* (2013.01); *G02B 7/022* (2013.01)

(56) References Cited

U.S. PATENT DOCUMENTS

| | | | | |
|---|---|---|---|---|
| 2004/0208210 | A1* | 10/2004 | Inoguchi | H01L 25/0753 372/36 |
| 2006/0152820 | A1* | 7/2006 | Lien | F21V 5/04 359/726 |
| 2006/0208267 | A1* | 9/2006 | Chin | H01L 33/58 257/98 |
| 2007/0019416 | A1* | 1/2007 | Han | H01L 33/58 362/307 |
| 2008/0037252 | A1* | 2/2008 | Nii | H01L 33/60 362/267 |
| 2011/0114979 | A1* | 5/2011 | Jang | H01L 33/486 257/98 |
| 2013/0201694 | A1* | 8/2013 | Feng | G02B 3/04 362/335 |
| 2014/0328083 | A1* | 11/2014 | Oh | H01L 33/486 362/612 |

FOREIGN PATENT DOCUMENTS

| | | |
|---|---|---|
| JP | 2005-136101 A | 5/2005 |
| JP | 2009-21221 | 1/2009 |
| JP | 2009-176579 | 8/2009 |
| JP | 2010-034019 | 2/2010 |
| KR | 1020070025861 A | 3/2007 |
| WO | 2012/041639 A1 | 4/2012 |

OTHER PUBLICATIONS

International Search Report dated Mar. 26, 2014; PCT/KR2013/010966.

* cited by examiner

LIGHT EMITTING DEVICE INCLUDING A LENS AT A PREDETERMINED POSITION AND BACKLIGHT UNIT COMPRISING SAME

TECHNICAL FIELD

The present invention relates to a light emitting device and a backlight unit including the same and, more particularly, to a light emitting device capable of bonding a lens at a preset accurate position, and a backlight unit including the same.

BACKGROUND ART

A light emitting element is generally used as a light source of a backlight unit in an electronic device, e.g., a display device. The light emitting element may be packaged in various forms before being coupled to a backlight module, and the backlight unit includes such a light emitting device.

To increase forward irradiation efficiency of light emitted from the light emitting device, a lens may be added. Specifically, after the light emitting device is mounted on, for example, a printed circuit board, a lens having a space larger than the light emitting device therein may be bonded to the printed circuit board using, for example, an adhesive member.

DETAILED DESCRIPTION OF THE INVENTION

Technical Problem

However, a conventional light emitting device has a problem in that a lens can be bonded to a printed circuit board while the lens is not accurately aligned with the light emitting device.

The present invention provides a light emitting device capable of bonding a lens at a preset accurate position, and a backlight unit including the same. However, the above technical problem is merely exemplary and the scope of the present invention is not limited thereto.

Technical Solution

According to an aspect of the present invention, there is provided a light emitting device including a molded material having an opening through which light generated from a light emitting element disposed in the molded material is emitted, a projecting support disposed along at least part of a circumference of the opening of the molded material, and a lens having an inner surface that defines an internal surface on which light emitted from the light emitting element is incident, an outer surface that defines an external surface from which the incident light is emitted to the outside, and a bottom surface that connects the inner surface and the outer surface, wherein a boundary between the inner surface and the bottom surface contacts the projecting support, or a lower part of the inner surface contacts the projecting support, or the bottom surface contacts the projecting support.

The projecting support may have a sliding surface, a height of which from the molded material is gradually reduced in a direction away from the opening of the molded material.

The projecting support may have a stepped portion.

The projecting support may have a surface-contact supporting surface that comes into surface-contact with the bottom surface of the lens.

The projecting support may be divided into a plurality of pieces and the plurality of pieces are discontinuity disposed along the circumference of the opening of the molded material, and a recessed empty space defined by the inner surface of the lens may be communicable with the outside of the lens.

The projecting support may be divided into three pieces and the three pieces are spaced apart from each other at a certain angle.

The projecting support and the molded material may be formed as a single piece.

The light emitting device may further include a lead frame on which the light emitting element is mounted and includes a first lead and a second lead spaced apart from each other, the molded material may be bonded to the lead frame such that part of a top surface of the first lead and part of a top surface of the second lead are exposed, a lower part of the opening of the molded material may have a shape having four sides that are not parallel to one direction along which a lead separation region between the first and second leads extends, and an upper part of the opening of the molded material may have a circular shape. In this case, a convergence point of two sides that converge on the first lead among the four sides may be connected to a first curve projecting in a direction away from the lead separation region, and a convergence point of two sides that converge on the second lead among the four sides may be connected to a second curve projecting in a direction away from the lead separation region.

According to an aspect of the present invention, there is provided a backlight unit including a reflective sheet, a light guide plate disposed on or above the reflective sheet, and the above-described light emitting device disposed to emit light toward the light guide plate.

Advantageous Effects

According to an embodiment of the present invention, a light emitting device capable of bonding a lens at a preset accurate position, and a backlight unit including the same may be implemented. However, the above effect is merely exemplary and the scope of the present invention is not limited thereto.

<DESCRIPTION OF REFERENCE NUMERALS>

Figure 1:
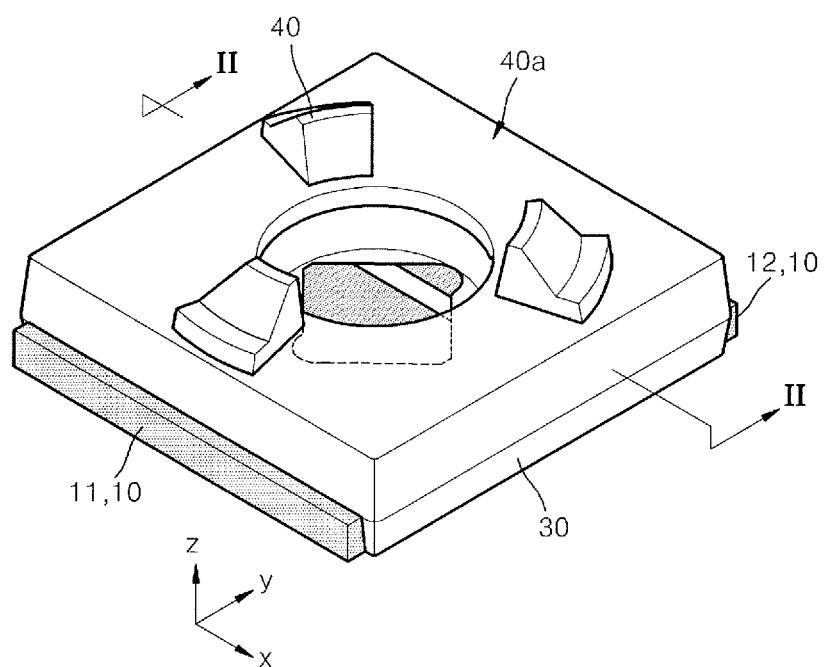
FIG. 1 is a partial perspective view of a light emitting device according to an embodiment of the present invention.

| | |
|---|---|
| 10: lead frame | 11: first lead |
| 12: second lead | 30: molded material |
| 32: opening | 40: projecting support |
| 42: sliding surface | 44: surface-contact supporting surface |
| 50: lens | 52: inner surface |
| 54: outer surface | 56: bottom surface |

EMBODIMENTS

Hereinafter, the present invention will be described in detail by explaining embodiments of the invention with reference to the attached drawings. The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the sizes of elements may be exaggerated or reduced for convenience of explanation.

In the following description, x, y, and z axes are not limited to three axes on an orthogonal coordinate system, and may be interpreted in a broader sense. For example, the x, y, and z axes may be orthogonal or non-orthogonal to each other.

Figure 2:
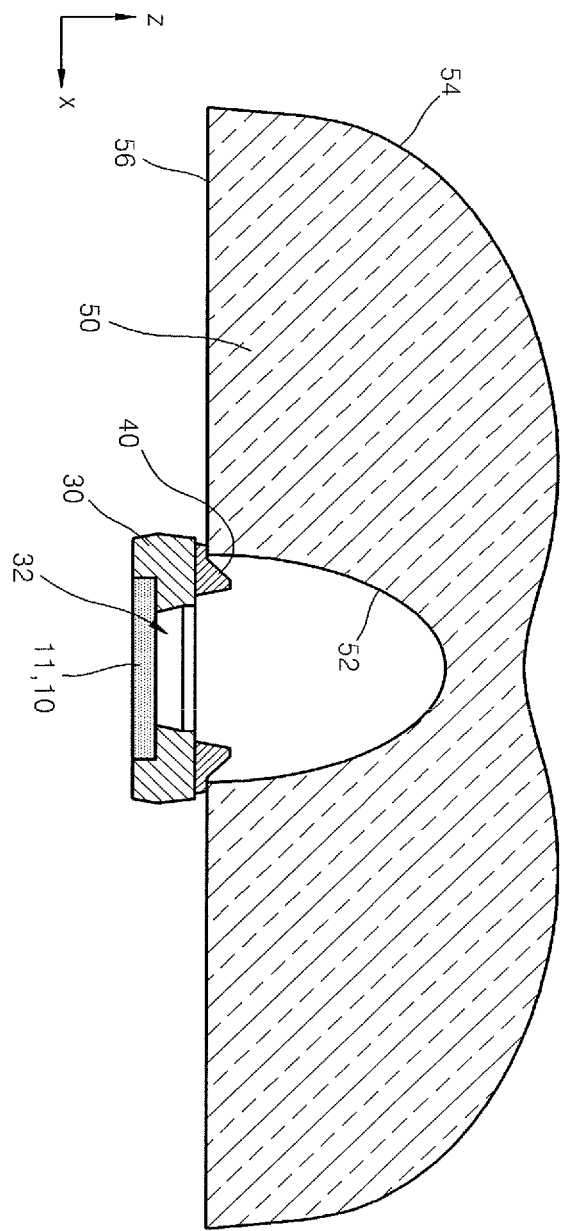
FIG. 2 is a cross-sectional view taken along line II-II of FIG. 1.
Figure 3:
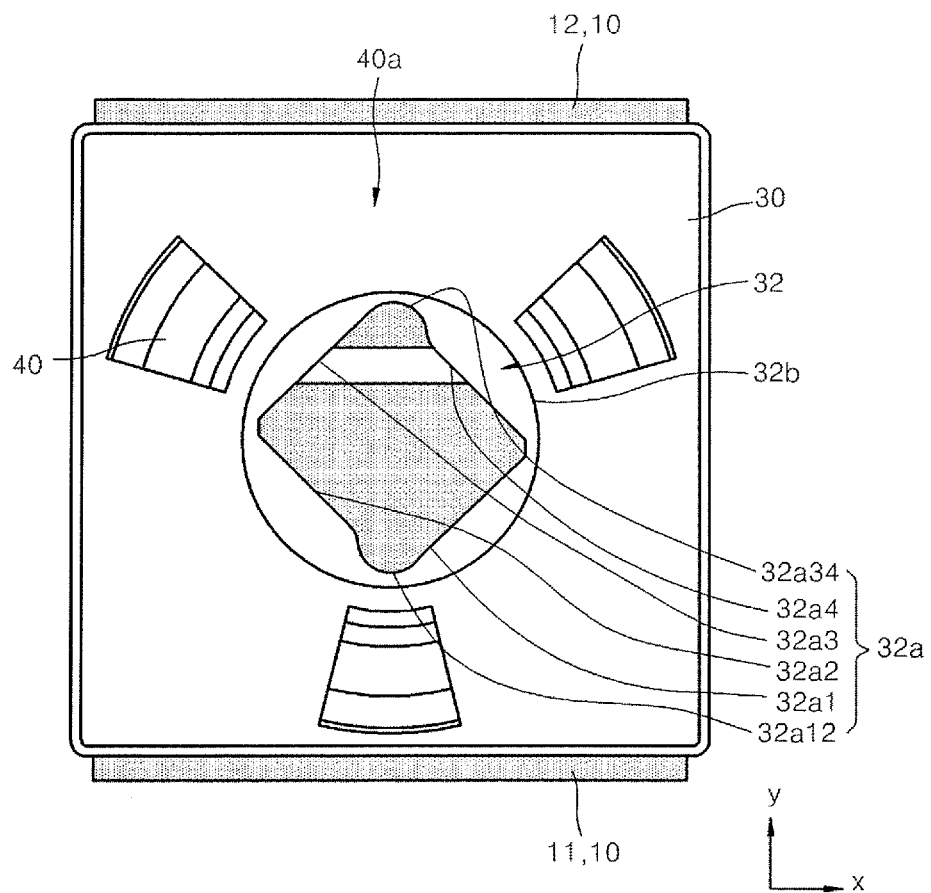
FIG. 3 is a plan view of the light emitting device of FIG. 1.
Figure 4:
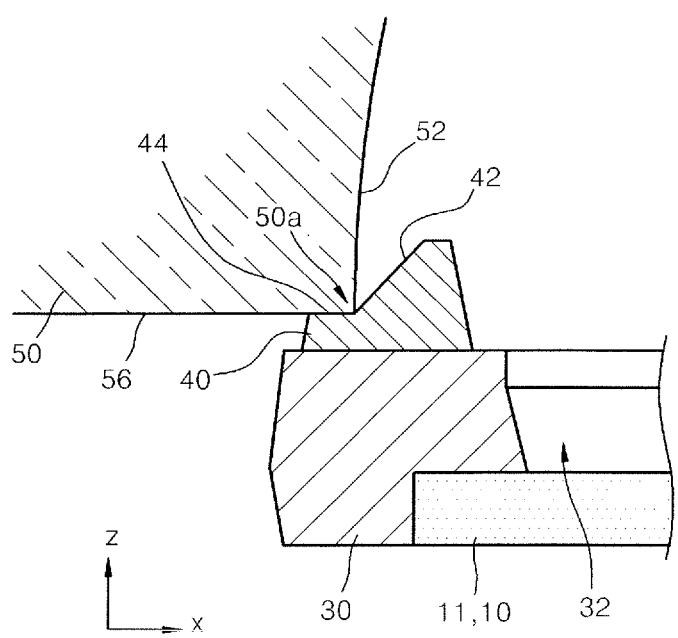
FIG. 4 is a magnified partial cross-sectional view of the light emitting device of FIG. 1.

FIG. 1 is a partial perspective view of a light emitting device according to an embodiment of the present invention. FIG. 2 is a cross-sectional view taken along a line II-II of FIG. 1, FIG. 3 is a plan view of the light emitting device of FIG. 1, and FIG. 4 is a magnified partial cross-sectional view of the light emitting device of FIG. 1. The light emitting device according to the current embodiment includes a lead frame 10, a light emitting element (not shown), a molded material 30, a projecting support 40 and a lens 50.

The lead frame 10 may include a first lead 11 and a second lead 12 spaced apart from each other. The lead frame 10 may further include lead(s). For example, the lead frame 10 may include a die pad for mounting the light emitting element, and a first lead and a second lead spaced apart from the die pad. In FIGS. 1 to 4, the first and second leads 11 and 12 are spaced apart from each other in the y direction, and a lead separation region extending in the x direction exists.

The light emitting element is mounted on the lead frame 10 and is electrically connected to the first and second leads 11 and 12. The light emitting element may be located, for example, on the first lead 11, or over the first and second leads 11 and 12. The light emitting element is an element for emitting light by receiving an electrical signal, and may be used as a light source in various electronic devices. For example, the light emitting element may be configured as a diode of a compound semiconductor, and this light emitting element may be configured as a diode of a compound semiconductor, and this light emitting element may be called a light emitting diode (LED). The LED may emit light of various colors depending on a material of the compound semiconductor.

The light emitting element may be electrically connected to the first lead 11 and/or the second lead 12 using a conductive adhesive member or wiring.

The molded material 30 may be bonded to the lead frame 10 to form the overall appearance of the light emitting device. The molded material 30 has an opening 32 through which light generated from the light emitting element is emitted. In FIGS. 1 to 4, the opening 32 of the molded material 30 allows light generated from the light emitting element to proceed in the =z direction. Eventually, it may be understood that the molded material 30 has the opening 32 to emit light generated from the light emitting element located therein.

The molded material 30 may be formed using resin through transfer molding. Alternatively, various modifications are allowed here. For example, instead of transfer molding, the molded material 30 may be formed through injection molding. The resin used to form the molded material 30 may include epoxy.

A light-transmitting filler (not shown) for covering the light emitting element may be formed as necessary to protect the light emitting element from external moisture or the like. The filler may be mixed with a fluorescent material and may be completely or partially filled in the opening 32 of the molded material 30. Alternatively, a filler mixed with a fluorescent material may be partially filled, and then a filler having no fluorescent material (transparent filler) may be additionally filled.

The projecting support 40 is disposed along at least part of the circumference of the opening 32 of the molded material 30. In FIGS. 1 to 4, the projecting support 40 is discontinuity disposed along the circumference of the opening 32 of the molded material 30, and connection paths 40a are formed between pieces of the projecting support 40. The function of the connection paths 40a will be described below.

To prevent excessive reduction in brightness, the width and number of the pieces of the projecting support 40 may be adjusted in such a manner that a sum of inner surfaces of the projecting support 40 toward the opening 32 is within 25% of a total circumferential surface formed by extending the inner surfaces of the projecting support 40. For example, the projecting support 40 may be divided into a plurality of pieces and the plurality of pieces may be discontinuity disposed along the circumference of the opening 32 of the molded material 30 and spaced apart from each other at a certain interval or angle. For example, according to the current embodiment, the projecting support 40 is divided into three pieces radially spaced apart from each other at an angle of 120°.

The projecting support 40 may be bonded to the molded material 30 using an adhesive, or may be thermally bonded to the molded material 30 without using any adhesive by melting and then hardening parts of the projecting support 40 or the molded material 30. In the latter case, the projecting support 40 and the molded material 30 may be ultimately understood as one body. Alternatively, the projecting support 40 and the molded material 30 may be formed as a single piece from the beginning using various methods such as transfer molding.

The lens 50 includes an inner surface 52, an outer surface 54 and a bottom surface 56. The inner surface 52 defines an internal surface on which light emitted from the light emitting element is incident, the outer surface 54 defines an external surface from which the incident light is emitted to the outside, and the bottom surface 56 connects the inner surface 52 and the outer surface 54 to each other. The space between the light incident surface defined by the inner surface 52 of the lens 50, and the light emitting element may be filled with air, or may be filled with another material as necessary. For convenience of explanation, it is assumed that the space is filled with air in the following description. The lens 50 may be formed of various materials, e.g., light-transmitting resin.

When an empty space inside a lens is filled with air, in general, a conventional light emitting device is mounted on a printed circuit board or the like and then the lens having a space larger than the light emitting device is bonded to the printed circuit board on which the light emitting device is mounted, using an adhesive member. However, in the case of the conventional light emitting device, the lens may be bonded to the printed circuit board while the lens is not accurately aligned with the light emitting device.

That is, since the light emitting device is located in the empty space inside the lens, which is larger than the light emitting device, when the lens is bonded to the printed circuit board. As such, the lens may be bonded to the printed circuit board while the dead center of the lens is not aligned with the dead center of the light emitting device. This misalignment may cause reduction in quality of emitted light. For example, a color coordinate of light emitted from the light emitting device and passed through the lens may vary, or a peak brightness location may be changed.

However, the light emitting device according to the current embodiment includes the lens 50, fills air in the recessed space of the lens 50, and may always locate the lens 50 at the same position when the lens 50 is bonded to the molded material 30. That is by allowing a boundary 50a between the inner surface 52 and the bottom surface 56 of the lens 50 to contact the projecting support 40, the lens 50 may be bonded to the molded material 30 and/or the projecting support 40 to ensure the same position of the lens 50 based on the light emitting element.

The projecting support 40 may have a stepped part. As such, the boundary 50a between the inner surface 52 and the bottom surface 56 of the lens 50 contacts the stepped part of the projecting support 40, and thus the lens 50 may be bonded to the molded material 30 and/or the projecting support 40 to ensure the same position of the lens 50 based on the light emitting element. In particular, as shown in FIG. 4, the projecting support 40 may have a sliding surface 42, the height of which from the molded material 30 is gradually reduced in a direction away from the opening 32 of the molded material 30 (e.g., −x direction in FIG. 4). The sliding surface 42 may automatically align the position of the lens 50.

That is, if the lens 50 is roughly aligned with the light emitting element on the molded material 30 and/or the projecting support 40 and then moved toward the molded material 30 and/or the projecting support 40, when the boundary 50a between the inner surface 52 and the bottom surface 56 of the lens 50 is located on the sliding surface 42 of the projecting support 40, the boundary 50a slides down along the sliding surface 42 and this is located at a preset position. As such, the lens 50 may be accurately aligned with the light emitting element. If the lens 50 has been accurately aligned with the light emitting element before moving the lens 50 toward the molded material 30 and/or the projecting support 40, the lens 50 may not slide on the sliding surface 42 and the boundary 50a between the inner surface 52 and the bottom surface 56 of the lens 50 may be directly located at a preset position on the projecting support 40.

The projecting support 40 may have a surface-contact supporting surface 44 surface-contacting the bottom surface 56 of the lens 50. As such, the bottom surface 56 of the lens 50 may surface-contact the surface-contact supporting surface 44 of the projecting support 40 while the lens 50 is accurately aligned with the light emitting element. As necessary, an adhesive capable of ensuring bonding between the projecting support 40 and the lens 50 may be used at the surface-contacting part.

In this case, the boundary 50a between the inner surface 52 and the bottom surface 56 of the lens 50 on the projecting support 40 may be ultimately located at a part where the sliding surface 42 and the surface-contact supporting surface 44 of the projecting support 40 meet each other.

The above-described projecting support 40 may not only locate the lens 50 at a preset position with respect to the light emitting element, but also improve optical properties of emitted light. That is, if such a projecting support does not exist, a part of light emitted from a light emitting element is emitted to the outside through a part where a molded material and a lens meet each other. For example, a color coordinate of such light may differ from the color coordinate of light emitted to the outside through another part of the lens. Thus, reduction in quality of emitted light may be caused.

However, in the light emitting device according to the current embodiment, the projecting support 40 is disposed between the molded material 30 and the lens 50 and sufficiently covers the space between the molded material 30 and the lens 50. Accordingly, light emitted from the light emitting element may be prevented from being emitted to the outside through a part between the molded material 30 and the lens 50, and thus reduction in quality of light emitted to the outside may be prevented.

Although the projecting support 40 may be continuously disposed along the circumference of the opening 32 of the molded material 30, the projecting support 40 may be discontinuity disposed along the circumference of the opening 32 of the molded material 30 and the connection paths 40 may be formed between pieces of the projecting support 40 as described above.

In the light emitting device, the light emitting element emits light and generates heat. If such heat is not released to the outside, the molded material 30 or the lens 50 may be deformed. In the light emitting device according to the current embodiment, since the connection paths 40a are formed between pieces of the projecting support 40, a recessed empty space defined by the inner surface 52 of the lens 50 may be connected to the outside of the lens 50 through the connection paths 40a. As such, heat generated by the light emitting element under the space may be appropriately released to the outside.

As illustrated in FIGS. 1 to 4, a lower part 32a of the opening 32 of the molded material 30 may have a rectangular shape and an upper part 32b thereof may have a circular shape. The upper part 32b of the opening 32 of the molded material 30 is formed in a circular shape to allow light emitted from the light emitting element to be uniformly irradiated about an optical axis of the light emitting element. On the other hand, the lower part 32a of the opening 32 of the molded material 30 is formed in a rectangular shape to allow the light emitting element to be easily mounted on the light emitting device having a small size.

Specifically, the size of the molded material 30 should be reduced to reduce the size of the light emitting device. The size of the opening 32 of the molded material 30 should also be reduced as the size of the molded material 30 is reduced. Accordingly, the lower part 32a of the opening 32 of the molded material 30 should be formed in a rectangular shape corresponding to the shape of the light emitting element to reduce the size of the opening 32 of the molded material 30.

Furthermore, in the conventional case, the light emitting element is generally located on one of the first and second leads 11 and 12 and electrically connected to the first and second leads 11 and 12 through, for example, wire. However, as the size of the light emitting device is reduced, that is, as the size of the molded material 30 is reduced, an exposed area of the first and second leads 11 and 12 in the opening 32 of the molded material 30 is inevitably reduced. Accordingly, instead of locating the light emitting element on only one of the first and second leads 11 and 12, the light emitting element may be located over the first and second leads 11 and 12 and electrically connected to the first and second leads 11 and 12 through, for example, wire. Alternatively, various modifications are allowed here. For example, instead of locating the light emitting element over the first and second leads 11 and 12, the light emitting element may be located over the first lead 11 and the lead separation region between the first and second leads 11 and 12.

Since an exposed area of the first and second leads 11 and 12 in the opening 32 of the molded material 30 is inevitably reduced as the size of the light emitting device is reduced, that is, as the size of the molded material 30 is reduced, when the first and second leads 11 and 12 are connected to the light emitting element through wire, a structure capable of efficiently ensuring a region to bond the wire on the first and second leads 11 and 12 is necessary.

In this regard, as illustrated in FIG. 3, the molded material 30 may be bonded to the lead frame 10 to expose a part of a +z direction top surface of the first lead 11 and a part of a +z direction top surface of the second lead 12, and the lower part 32a of the opening 32 of the molded material 30 may have a shape including four sides not parallel to one direction (x-axis direction) in which the lead separation region between the first and second leads 11 and 12 extends. That is, the lower part 32a of the opening 32 of the molded material 30 may have a rectangular shape, and four sides 32a1, 32a2, 32a3, and 32a4 of the rectangular shape may not parallel to one direction (x-axis direction) in which the lead separation region between the first and second leads 11 and 12 extends.

If the lower part 32a of the opening 32 of the molded material 30 has a rectangular shape and the four sides 32a1, 32a2, 32a3, and 32a4 of the rectangular shape are parallel to one direction (x-axis direction) in which the lead separation region between the first and second leads 11 and 12 extends, when the opening 32 of the molded material 30 has a small size, sufficient exposure of the top surfaces of the first and second leads 11 and 12 in the opening 32 of the molded material 30 may not be ensured. However, if the lower part 32a of the opening 32 of the molded material 30 has a rectangular shape and the four sides 32a1, 32a2, 32a3, and 32a4 of the rectangular shape are not parallel to one direction (x-axis direction) in which the lead separation region between the first and second leads 11 and 12 extends, since two facing vertices of the rectangular shape are located on the top surface(s) of the first lead 11 and/or the second lead 12, even when the opening 32 of the molded material 30 has a small size, exposure of the top surfaces of the first and second leads 11 and 12 in the opening 32 of the molded material 30 may be ensured.

In addition, as illustrated in FIG. 3, a convergence point of the two sides 32a1 and 32a2 which converge on the first lead 11 among the four sides 32a1, 32a2, 32a3, and 32a4 may be connected to a first curve 32a12 projecting in a direction (−y direction) away from the lead separation region. A convergence point of the two sides 32a3 and 32a4 which converge on the second lead 12 among the four sides 32a1, 32a2, 32a3, and 32a4 may be connected to a second curve 32a34 projecting in a direction (+y direction) away from the lead separation region.

The first curve 32a12 projecting in a direction (−y direction) away from the lead separation region on the first lead 11 and the second curve 32a34 projecting in a direction (+y direction) away from the lead separation region on the second lead 12 may expand the area of the exposed top surfaces of the first and second leads 11 and 12. As such, the region where the wire electrically connected to the light emitting element contacts the first and second leads 11 and 12 may be increased.

Figure 5:
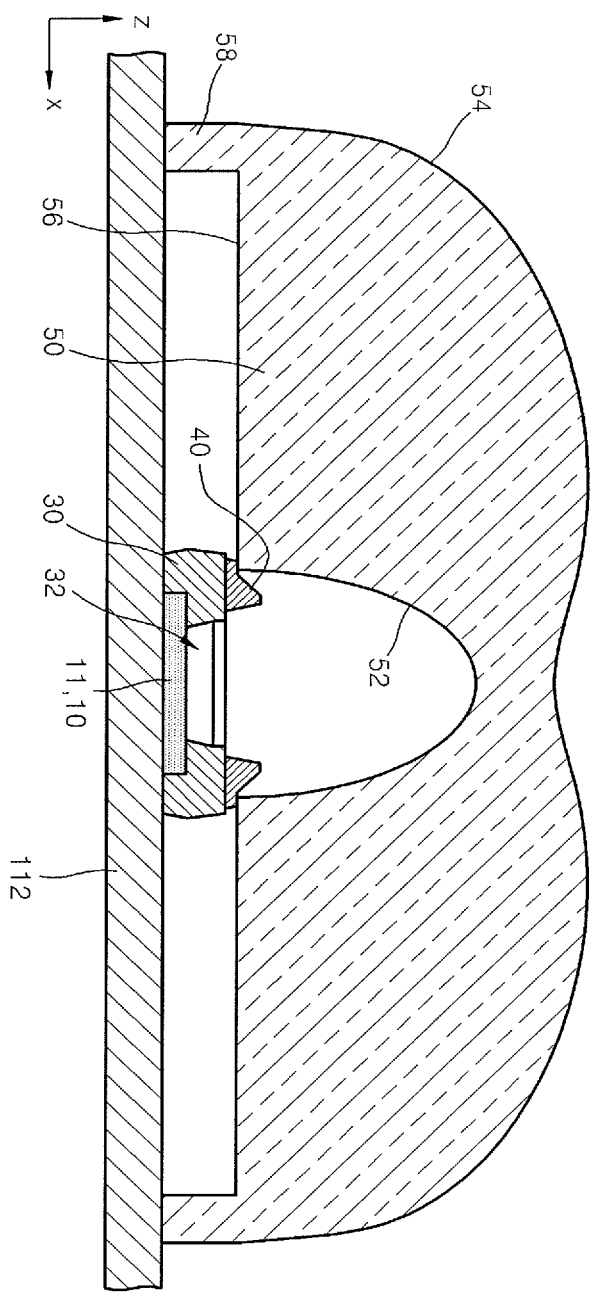
FIG. 5 is a cross-sectional view of a light emitting device according to another embodiment of the present invention.

FIG. 5 is a cross-sectional view of a light emitting device according to another embodiment of the present invention. The light emitting device according to the current embodiment differs from the light emitting device according to the previous embodiment of FIGS. 1 to 4 in that the lens 50 has a projection 58 projecting downward from the bottom surface 56, and this projection 58 contacts printed circuit board 112 on which the light emitting device is mounted. The projection 58 may be continuously disposed (in a ring shape) around the molded material 30 along the circumference of the lens 50, or may include a plurality of columns projecting from the bottom surface 56 of the lens 50.

The projection 58 of the lens 50 may increase mechanical stability of the lens 50. If the projection 58 of the lens 50 is fixed to the printed circuit board 112 using, for example, an adhesive, bonding stability between the light emitting device including the lens 50 and the printed circuit board 112 may be increased.

Although at least a part of an outer circumferential surface of the projection 58 of the lens 50 extends from the outer surface 54 of the lens 50 in FIG. 5, the present invention is not limited thereto as long as the projection 58 projects from the bottom surface 56 of the lens 50.

Figure 6:
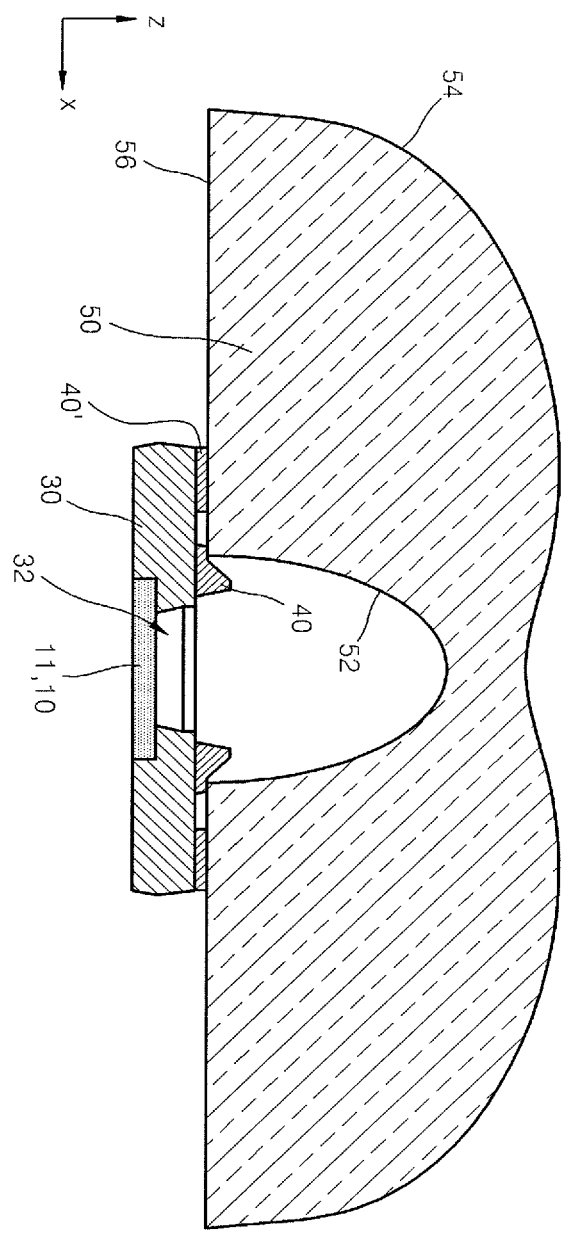
FIG. 6 is a cross-sectional view of a light emitting device according to another embodiment of the present invention.

FIG. 6 is a cross-sectional view of a light emitting device according to another embodiment of the present invention. As illustrated in FIG. 6, the light emitting device may further include a projecting contact 40' in addition to the projecting support 40.

The projecting contact 40' is disposed on a top surface of the molded material 30 farther away from the opening 32 of the molded material 30 compared to the projecting support 40.

The projecting contact 40' may contact the bottom surface 56 of the lens 50 to increase mechanical stability of the lens 50. If the projecting contact 40' is bonded to the bottom surface 56 of the lens 50 using, for example, an adhesive, bonding stability between the lens 50 and the molded material 30 may be increased.

Although the projecting contact 40' is an additional structure different from the molded material 30 in FIG. 6, the additional structure is exemplary and the projecting contact 40' may be a part of the molded material 30. The projecting contact 40' may be continuously disposed (in a ring shape) around the opening 32 of the molded material 30, or may be divided into a plurality of pieces spaced apart from each other.

Alternatively, various modifications are allowed here. For example, instead of the projecting contact 40', a projection may exist on the bottom surface 56 of the lens 50 where the projecting contact 40' exists on FIG. 6 and a bottom surface of the projection may be bonded to the top surface of the molded material 30.

Figure 7:
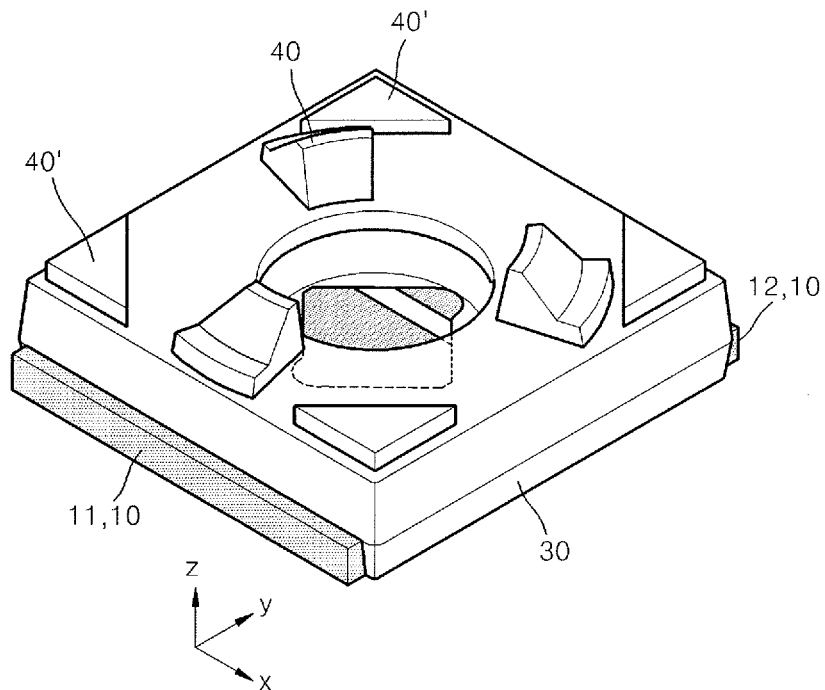
FIG. 7 is a partial perspective view of a light emitting device according to another embodiment of the present invention.

FIG. 7 is a partial perspective view of a light emitting device according to another embodiment of the present invention. As illustrated in FIG. 7, the light emitting device may include a projecting contact 40' disposed on the top surface of the molded material 30 at corners of the molded material 30.

The projecting contact 40' may contact the bottom surface 56 of the lens 50 to increase mechanical stability of the lens 50. If the projecting contact 40' is bonded to the bottom surface 56 of the lens 50 using, for example, an adhesive, bonding stability between the lens 50 and the molded material 30 may be increased. In particular, since the projecting contact 40' is disposed at corners of the molded material 30, stability of the lens 50 may be increased without increasing the size of the molded material 30. Although the projecting contact 40' is an additional structure different from the molded material 30 in FIG. 7, the additional structure is exemplary and the projecting contact 40' may be a part of the molded material 30.

Figure 8:
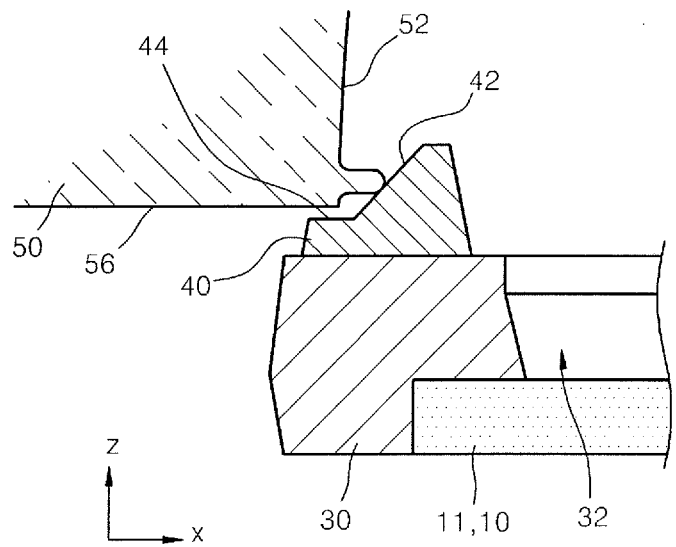
FIG. 8 is a magnified partial cross-sectional view of a light emitting device according to another embodiment of the present invention.

FIG. 8 is a magnified partial cross-sectional view of a light emitting device according to another embodiment of the present invention. The light emitting device according to the current embodiment differs from the light emitting device according to the previous embodiment of FIGS. 1 to 4 in that the part of the lens 50 which contacts the projecting support 40 is changed.

Although the boundary between the inner surface 52 and the bottom surface 56 of the lens 50 may contact the projecting support 40 as described above, a lower part (for example, having a projection) of the inner surface 52 of the lens 50 may contact the projecting support 40 as illustrated in FIG. 8. Alternatively, the bottom surface 56 (for example, having a projection) of the lens 50 may contact the projecting support 40. In this case, the lower part (for example, having a projection) of the inner surface 52 of the lens 50 may contact the sliding surface 42 of the projecting support 40 as illustrated in FIG. 8, and the bottom surface 56 of the lens 50 may contact the surface-contact supporting surface 44 of the projecting support 40 differently from the illustration of FIG. 8.

Figure 9:
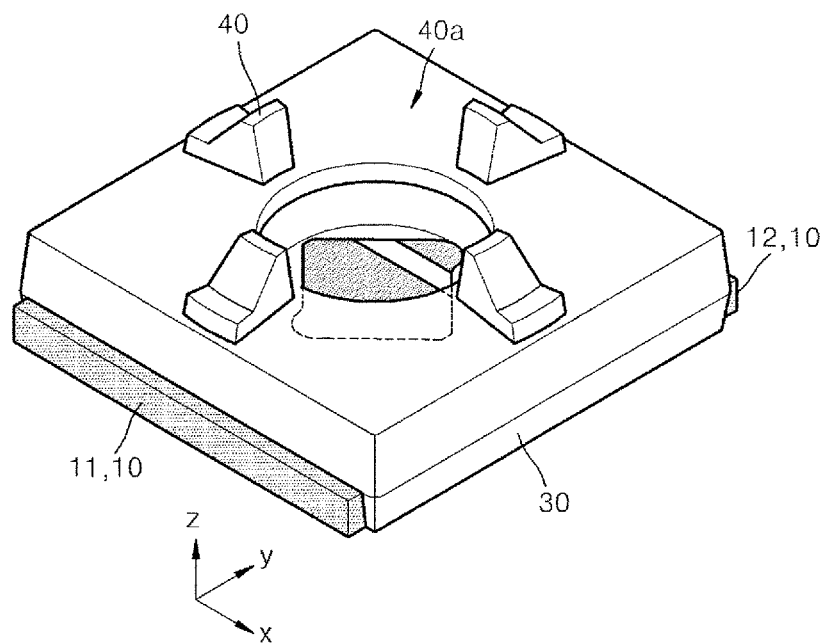
FIG. 9 is a perspective view of a light emitting device according to another embodiment of the present invention.

FIG. 9 is a perspective view of a light emitting device according to another embodiment of the present invention. The light emitting device according to the current embodiment is achieved by partially modifying the light emitting device of FIGS. 1 to 4, and thus repeated descriptions between the two embodiments are omitted here.

Referring to FIG. 9, the projecting support 40 is disposed along at least a part of the circumference of the opening 32 of the molded material 30. The projecting support 40 is discontinuity disposed along the circumference of the opening 32 of the molded material 30, and thus the connection paths 40a may be formed between pieces of the projecting support 40.

To prevent excessive reduction in brightness, the width and number of the pieces of the projecting support 40 may be adjusted in such a manner that a sum of inner surfaces of the projecting support 40 toward the opening 32 is within 25% of a total circumferential surface formed by extending the inner surfaces of the projecting support 40. For example, according to the current embodiment, the projecting support 40 may be divided into four pieces spaced apart from each other at an angle of 90°. According to a modified embodiment of the current embodiment, the projecting support 40 may be divided into five or more pieces.

Figure 10:
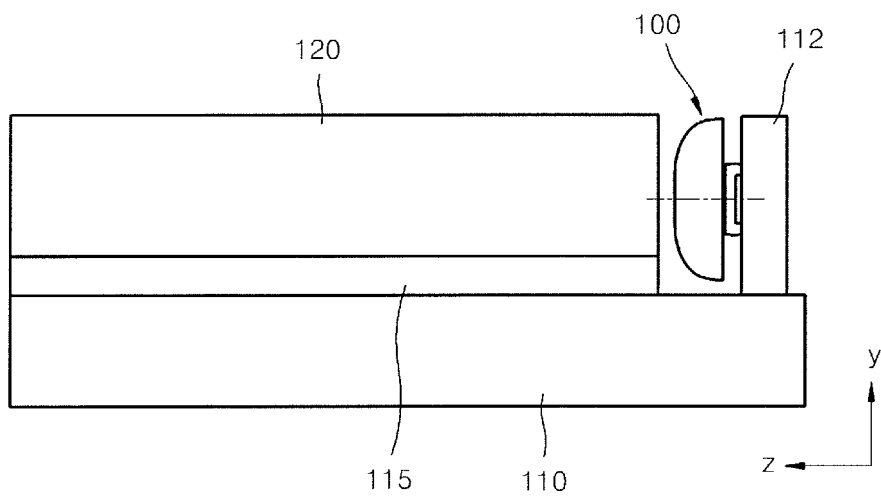
FIG. 10 is a side view of a backlight unit according to another embodiment of the present invention.

FIG. 10 is a side view of a backlight unit according to another embodiment of the present invention.

As illustrated in FIG. 10, the backlight unit according to the current embodiment includes a frame 110, a reflective sheet 115 disposed on part of the frame 110, a light guide plate 120 disposed on the reflective sheet 115, and a light emitting device 100 disposed on another part of the frame 110 to emit light toward the light guide plate 120 according to any of the above embodiments and/or modified embodiments thereof. The light emitting device 100 may be connected to the printed circuit board 112.

In the above-described backlight unit according to the current embodiment, since an error rate and a manufacturing cost of the light emitting device 100 may be reduced and a manufacturing yield thereof may be increased by ensuring accurate alignment of a lens with a light emitting element, a manufacturing yield of the backlight unit may be increased and a manufacturing cost thereof may be reduced. Although the light emitting device 100 is disposed at a side of the light guide plate 120 in the backlight unit of FIG. 10, the present invention is not limited thereto and is also applicable to a direct backlight unit in which a light guide plate is disposed on a reflective sheet and a light emitting device is disposed under the light guide plate.

While the present invention has been particularly shown and described with reference to exemplary embodiments thereof, it will be understood by one of ordinary skill in the art that various changes in form and details may be made therein without departing from the spirit and scope of the present invention as defined by the following claims.

The invention claimed is:
1. A light emitting device comprising:
a molded material including an opening through which light generated from a light emitting element disposed in the molded material is emitted;
a projecting support disposed along at least part of a circumference of the opening of the molded material;
a lens including an inner surface that defines an internal surface on which the light emitted from the light emitting element is incident, an outer surface that defines an external surface from which the incident light is emitted to the outside, and a bottom surface that connects the inner surface and the outer surface, wherein a boundary between the inner surface and the bottom surface contacts the projecting support, or a lower part of the inner surface contacts the projecting support, or the bottom surface contacts the projecting support; and
a lead frame on which the light emitting element is mounted and includes a first lead and a second lead spaced apart from each other,
wherein an upper part of the opening of the molded material includes a circular shape, and a lower part of the opening of the molded material includes a rectangular shape disposed in a footprint of the circular shape,
wherein the molded material is bonded to the lead frame such that part of a top surface of the first lead and part of a top surface of the second lead are exposed to an area defined by the rectangular shape,
wherein the rectangular shape includes four sides that are not parallel to one direction along which a lead separation region between the first and second leads extends,
wherein a convergence point of two sides that converge on the first lead among the four sides is connected to a first curve projecting in a direction away from the lead separation region, and
wherein a convergence point of two sides that converge on the second lead among the four sides is connected to a second curve projecting in a direction away from the lead separation region.

2. The light emitting device of claim 1, wherein the projecting support includes a sliding surface, a height of which from the molded material is gradually reduced in a direction away from the opening of the molded material.

3. The light emitting device of claim 1, wherein the projecting support includes a stepped portion.

4. The light emitting device of claim 1, wherein the projecting support includes a surface-contact supporting surface that comes into surface-contact with the bottom surface of the lens.

5. The light emitting device of claim 1, wherein the projecting support comprises a plurality of pieces that are separately disposed along the circumference of the opening of the molded material, and
wherein a recessed empty space defined by the inner surface of the lens is communicable with the outside of the lens.

6. The light emitting device of claim 1, wherein the projecting support comprises three pieces that are spaced apart from each other at a certain interval along the circumference of the opening of the molded material.

7. The light emitting device of claim 1, wherein the projecting support and the molded material are formed as a single piece.

8. A backlight unit comprising:
a reflective sheet;
a light guide plate disposed on or above the reflective sheet; and
the light emitting device of claim 1, disposed to emit light toward the light guide plate.

9. A light emitting device comprising:
a lead frame on which a light emitting element is mounted and includes a first lead and a second lead spaced apart from each other; and
a molded material including an opening through which light generated from the light emitting element is emitted, and being bonded to the lead frame such that part of a top surface of the first lead and part of a top surface of the second lead are exposed,
wherein a lower part of the opening of the molded material includes a shape having four sides that are not parallel to one direction along which a lead separation region between the first and second leads extends, and
wherein a convergence point of two sides that converge on the first lead among the four sides is connected to a first curve projecting in a direction away from the lead separation region, and a convergence point of two sides that converge on the second lead among the four sides is connected to a second curve projecting in a direction away from the lead separation region.

10. The light emitting device of claim 9, further comprising:
a projecting support disposed along at least part of a circumference of the opening of the molded material; and
a lens including an inner surface that defines an internal surface on which the light emitted from the light emitting element is incident, an outer surface that defines an external surface from which the incident light is emitted to the outside, and a bottom surface that connects the inner surface and the outer surface,
wherein a boundary between the inner surface and the bottom surface contacts the projecting support, or a lower part of the inner surface contacts the projecting support, or the bottom surface contacts the projecting support.

11. The light emitting device of claim 9, further comprising:
wherein an upper part of the opening of the molded material includes a circular shape, and a lower part of the opening of the molded material includes a rectangular shape disposed in a footprint of the circular shape, and
wherein the molded material is bonded to the lead frame such that part of a top surface of the first lead and part of a top surface of the second lead are exposed to an area defined by the rectangular shape.

12. The light emitting device of claim 1, wherein the first curve and the second curve are configured to expand an area of the exposed top surfaces of the first lead and the second lead.

13. The light emitting device of claim 1, wherein a convergence point of two sides that converge on the first lead or the second lead among the four sides is connected to a curve projecting in a direction away from the lead separation region.

* * * * *